United States Patent [19]

Weigand

[11] 3,852,440
[45] Dec. 3, 1974

[54] REDUCING CHOLESTEROL LEVELS WITH SITOSTEROLS AND CHOLANIC ACID DERIVATIVES
[75] Inventor: Alan Hugh Weigand, Fort Lee, N.J.
[73] Assignee: Intellectual Property Development Corporation, New Rochelle, N.Y.
[22] Filed: Nov. 13, 1972
[21] Appl. No.: 304,295

Related U.S. Application Data
[63] Continuation-in-part of Ser. No. 208,887, Dec. 16, 1971, abandoned, and a continuation-in-part of Ser. No. 259,062, July 2, 1972, abandoned, which is a continuation of Ser. No. 126,296, March 19, 1971, abandoned.

[52] U.S. Cl................. 424/239, 424/238, 424/242, 424/243
[51] Int. Cl........................................... A61k 17/00
[58] Field of Search ............ 424/239, 242, 243, 238

[56] References Cited
FOREIGN PATENTS OR APPLICATIONS
663,188  10/1965  Belgium.............................. 424/238

OTHER PUBLICATIONS
P.D.R., 21st Ed., Published by Medical Economics, Inc., Oradell, N.J., 1966, pages 748 and 749.
Howe et al., J. Nutrition, Vol. 72, pages 379–386, 1960.
Thistle et al., Gastroenterology, Vol. 61, pages 488–496, Oct. 1971.

Primary Examiner—Richard L. Huff

[57]   ABSTRACT

A method for reducing the levels of cholesterol and other lipids in mammals, which comprises administering to said mammals a composition or compositions comprising a combination of an effective amount of a sitosterol selected from the group consisting of α-sitosterol, β-sitosterol and γ-sitosterol; and an effective amount of a compound of the formula:

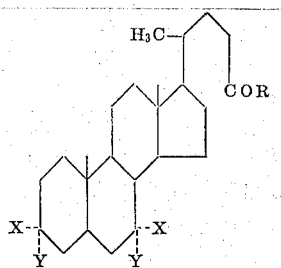

wherein R is selected from the group consisting of hydroxy; acyloxy; alkoxy; $NHCH_2COOH$, and $NHCH_2CH_2SO_3H$; each X is hydrogen; and each Y is hydroxy or acyloxy, and when taken together, X and Y is oxo (O=); or the non-toxic pharmaceutically acceptable salt thereof.

10 Claims, No Drawings

REDUCING CHOLESTEROL LEVELS WITH SITOSTEROLS AND CHOLANIC ACID DERIVATIVES

This application is a continuation-in-part application of my previously filed, pending application Ser. No. 208,887 filed Dec. 16, 1971. This application is also a continuation in part application of my prior filed application Ser. No. 259,062, filed July 2, 1972, which in turn is a continuation application of a prior filed application, Ser. No. 126,296, filed Mar. 19, 1971 all the above applications are now abandoned.

This invention relates to and has as its objective a method of reducing the levels of cholesterol and other lipids in mammals. Current medical theory holds that there is a causal relationship between elevated cholesterol and lipid levels and the development of artherosclerosis conditions in mammals. Artherosclerotic conditions are a major underlying cause of death by virtue of their relationship to hardening and narrowing of blood vessel walls and the occurrence of thromboses leading to coronary attacks and strokes.

In addition, it is believed that in many hyperlipidemic and/or hypercholesteremic conditions over active or excessive cholesterol synthesis may be responsible for the development of the condition. In some hyperlipidemic and/or hypercholesteremic conditions, the patient may not suffer from excessive cholesterol synthesis but rather an inability to metabolize or mobilize the cholesterol being produced or distributed in the system. In these cases, therefor, it should be considered that even normal cholesterol or lipid synthesis is at an over active or excessive rate. When in certain cases, excess cholesterol is synthesized or otherwise introduced into the system, the body reacts by distributing the excess cholesterol to various body pools where it is deposited and accumulates. Among the body pools wherein this excess lipid material may be distributed and deposited are included the gall bladder, wherein the deposits take the form of cholesterol stones, and the blood vessels wherein the deposits may be in the form of artherosclerotic plaque. Thus, the presence of excess levels of cholesterol in the body, to which the body naturally reacts by distribution and deposition thereof to various body pools, results in such adverse conditions as cholesterol gall stones and artherosclerotic plaque. Presently, there are available medically approved substances which are prophylactically administeaed to patients for the purpose of reducing cholesterol and lipid levels. Such products, for example clofibrate, (commercially available from Ayerst Laboratories under the tradename "Atromid") are known cholesterol inhibitors and must be chronically administered in substantial daily doses over extended, and as yet not fully determined, periods of time to achieve their purpose. To date, there is no knowledge as to the possible toxic effect the chronic administration of these presently used cholesterol inhibiting agents will have on the patients being treated therewith.

It has also been attempted to reduce hypercholesteremia in mammals by the use of sitosterols, and such products are presently available on the market (for example, under the tradename, "Cytellin" from the Eli Lilly Company). These sitosterol products do not in and of themselves reduce the body cholesterol level of the mammal, but rather compete with and prevent the absorption of ingested cholesterol in the intestine of the patient. Thus, the sitosterols act as cholesterol absorption inhibitors, with the result that the body cholesterol level of the patient which is lowered by normal metabolism of cholesterol cannot be replenished by ingested cholesterol. Thus, it can be said that the sitosterols act somewhat as mobilizers of cholesterol. However, it has been discovered that by some unexplained mechanism, the patient reacts to this reduction in the body pool of cholesterol by synthesizing additional cholesterol to maintain the original body cholesterol level. Therefor, this treatment with sitosterols has been found to be unsatisfactory for lowering body cholesterol levels over extended periods of time, as is required in the treatment of hypercholesteremic patients. In addition, it does not appear that any of the substances hereinbefore administered to lower cholesterol and other lipid levels has resulted in the reversal of the mechanism by which the excess cholesterol concentrations are deposited in various body pools, thereby creating the adverse conditions hereinbefore described.

It now appears that the rate limiting step in the synthesis of cholesterol in the body may be the conversion of $3\beta$-hydroxy-$3\beta$-methyl glutaric acid to mevalonic acid. This reaction seems to be controlled by the activity of a catalytic enzyme, $3\beta$-hydroxy-$3\beta$-methyl glutaryl Co A reductase (herein after referred to as "HMG CoA reductase"). Therefore, by controlling the activity of this enzyme, the synthesis of cholesterol is controlled. By controlling the synthesis of cholesterol in the body, it is possible to reverse the mechanism whereby the body distributes and causes the deposit of excess cholesterol in various body pools, such as the gall bladder and blood vessels. Inhibiting or suppressing synthesis of cholesterol causes the body to deplete or withdraw from the various body pools, wherein excess cholesterol was previously deposited, the excess cholesterol therein deposited and accumulated. Therefore, the suppression of cholesterol synthesis will result in the overall reduction of cholesterol and other lipid levels in the body. More particularly, by suppression of cholesterol synthesis with a concommutant reversal of the mechanism whereby excess cholesterol is deposited in various body pools, there results a reversal of such conditions as cholesterol gall stones, i.e. reduction in size or dissolution of the stones, and artherosclerotic plaque formation in the blood vessels.

In addition, the entire therapeutic treatment of the hyperlipidemic conditions described herein would be enhanced if a cholesterol "mobilizer", such as the sitosterols, could be employed without encountering the adverse reaction of increased cholesterol production, heretofore experienced in connection with the use thereof.

There has now been discovered a method whereby the cholesterol and other lipid levels in mammals may be satisfactorily and safely reduced. More particularly, I have discovered a method to reduce the cholesterol and lipid levels of mammals, which comprises administering to said mammals a composition or compositions comprised of an effective amount of sitosterol, preferably $\beta$-sitosterol, in combination with an effective amount of a compound of the formula:

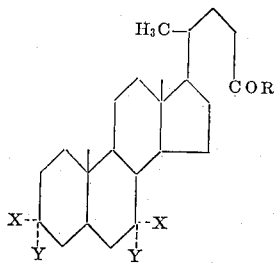

wherein R is selected from the group consisting of hydroxy, acyloxy, alkoxy; $NHCH_2COOH$, and $NHCH_2CH_2SO_3H$; each X is hydrogen; each Y is selected from the group consisting of hydroxy and acyloxy; and when taken together, X and Y is oxo (O=). These compounds may be administered in the form of their alkaline metal salts also, for example the sodium or potassium salts which are well known in the art.

The preferred acyloxy radicals are those of hydrocarbon carboxylic acids of less than 12 carbon atoms, as exemplified by the lower alkanoic acids (e.g. acetic, propionic, and butyric acids), the lower alkenoic acids, the monocyclic aryl carboxylic acids (e.g. benzoic and toluic acids), the monocyclic aryl lower alkanoic acids (e.g. phenacetic and -phenyl-propionic acids), and the cycloalkane carboxylic acids.

The preferred alkoxy radicals are those containing up to 12 carbon atoms, and may be straight or branched chain, and include such moieties as methoxy, ethoxy, butoxy, t-butoxy and the like.

The preferred embodiment of this invention contemplates the employment of such compounds of Formula I as, $3\alpha,7\alpha$-dihydroxy-$5\beta$-cholanic acid; $3\alpha,7\alpha$-diacyloxy-$5\beta$-cholanic acid; 3,7-dioxo-$5\beta$-cholanic acid; $3\alpha$-acyloxy-$7\alpha$-hydroxy-$5\beta$-cholanic acid; $3\alpha$-hydroxy-7-oxo-$5\beta$-cholanic acid; 3-oxo-$7\alpha$-hydroxy-$5\beta$-cholanic acid; 3-oxo-$7\alpha$-hydroxy-$5\beta$-cholanic acid; $3\alpha$-hydroxy-$7\alpha$-acyloxy-$5\beta$-cholanic acid; and other like compounds. These compounds are well known or easily derived from known compounds by chemical processes well known to those skilled in the art.

Further satisfactory embodiments of the instant invention involve those compounds of Formula I, wherein R is $NHCH_2COOH$, or $NHCH_2CH_2SO_3H$. These materials are obtained by the conjugation of the respective free acids of Formula I, (i.e. wherein R is OH), with the respective amino acids, e.g. glycine or taurine, by standard reactions which are well known to the art.

Although the sitosterol component of the instant invention may be either $\alpha$-sitosterol, $\beta$-sitosterol, or $\gamma$-sitosterol, or a combination thereof, in its preferred embodiment, this invention provides most satisfactory results when $\beta$-sitosterol is employed.

By the practice of the instant invention, it is now possible to lower the cholesterol and lipid levels of the patient being treated. It is now possible to employ a mobilizing agent, such as the sitosterols, while at the same time eliminating the undesired reactive side effects of excessive cholesterol synthesis. In fact, the inhibition of synthesis and mobilization of cholesterol by the practice of this invention results in a decrease of the natural distribution of cholesterol into the plasma and bile of the mammal being treated, and consequently leads to a reversal of the process whereby excessive cholesterol has been previously deposited, resulting in the formation of cholesterol gall stones and artherosclerotic plaque.

The compositions of this invention may be administered to the patients being treated in accordance with the method of this invention. It has been found that satisfactory results are obtained when the compositions of this invention are orally administered to the patient. The compositions of this invention may comprise a combination of an effective amount of a sitosterol, such as $\alpha$-sitosterol, $\beta$-sitosterol, or $\gamma$-sitosterol, and an effective amount of a compound of Formula I, as hereinbefore defined. Alternatively, the individual components of this invention may be orally administered to the patient being treated in a sequential manner, either component being administered first.

It has been found that the effective amounts of the compositions of this invention required for initial therapy are those which provide a daily amount of from about 0.5 to 15.0 grams of the sitosterol component and from about 50 mg. to about 1.5 gm. of the compound of Formula I to the patient being treated. For this purpose, it has been found satisfactory to divide the daily dosage of the compositions of this invention into multiple units which may be administered to the patient periodically at convenient times of the day, for example, before or after each meal. Administration of the composition of the instant invention over a prolonged period of time may demonstrate to the skilled practitioner that reduced levels of the components thereof may be employed without altering the satisfactory results obtained. Thus, as may be determined by the skilled practitioner in reflection on the results obtained with individual patients, the dosage of the compositions employed may be varied as required. Depending upon the results obtained with the patient, the sitosterols may be employed in amounts wherein the daily dosage thereof is reduced to as low as 0.5 gm. per day, or even eliminated entirely.

To achieve the purposes and objectives of this invention, the active substances hereof may be incorporated in such suitable final dosage forms as may be satisfactorily prepared and employed by the skilled worker. Thus, the commonly employed, pharmaceutically acceptable dosage forms suitable for oral administration containing the active substance hereof in sufficient concentration to attain the desired results may be utilized. The pharmaceutically acceptable, non-toxic inert carriers usually employed for such purposes may be utilized to prepare such dosage forms as tablets, capsules, elixirs, solutions, suspensions and the like.

In addition to the foregoing, I have also found that high cholesterol levels in animals can be effectively reduced and can be maintained at a reduced level by treating these animals with a combination of an effective amount of a sitosterol and an effective amount of the compound, clofibrate. The method of administration of this combination may be the same as described hereinabove in regard to the compositions of Formula I. The amount of clofibrate found to be effective in the practice of this invention is from about 1.0 to 3.0 gm. administered on a daily basis, while the effective amount of the sitosterol is the same as hereinabove described.

The invention may be further illustrated by the following examples:

EXAMPLE I

Final, orally administerable dosage forms incorporating the amounts of active substances set forth in Table A were prepared and administered on a daily basis (i.e. the regimen was 3 times each day) to patients having abnormally elevated lipid, i.e. cholesterol and/or triglyceride, levels. These materials were administered to the patients over an extended period of time during which there was a substantial reduction in the patients lipid level, which was maintained during the period of therapy with the compositions of the instant invention.

TABLE A

| | Composition Ingredients | Amount |
|---|---|---|
| 1. | 3α,7α-dihydroxy-5β-cholanic acid | 400 mg. |
| | β-sitosterol | 3.0 gm. |
| 2. | 3α,7α-dihydroxy-5β-cholanic acid | 250 mg. |
| | β-sitosterol | 4.0 gm. |
| 3 | 3α,7α-dihydroxy-5β-cholanic acid | 400 mg. |
| | β-sitosterol | 1.0 gm. |
| 4. | 12-desoxy-cholytaurine | 250 mg. |
| | α-sitosterol | 350 mg. |
| 5. | 3α,7α-diacetoxy-5β-cholanic acid | 250 mg. |
| | γ-sitosterol | 1.0 gm. |
| 6. | 12-desoxy-cholylglycine | 500 mg. |
| | β-sitosterol | 750 mg. |
| 7. | 3α,7α-dihydroxy-5β-cholanic acid | 500 mg. |
| | β-sitosterol | 2.0 gm. |

EXAMPLE II

Male rats (Sprague-Dawley) were fed a stock diet consisting of ground Purina rat chow plus 5.0% corn oil. The sterol test materials were added to the diet at the 2.0% level (daily intake about 400 mg/day). The bile acid test materials, in the form of taurine conjugates, were added to the stock diet at the 1.0% level (daily intake about 200 mg/day).

The test animals were fed for a 1 week period after which they were anesthetized and the bile ducts cannulated. Bile was collected over a period of 30–60 minutes. At the end of the collection period, the test animals were sacrificed, their livers were removed and microsomal fractions were prepared by ultracentrifugation. The rate determining enzymes of cholesterol and bile acid synthesis (i.e. HMG CoA reductase and cholesterol 7α-hydroxylase, respectively) were assayed, along with bile acid and sterol concentrations. The results obtained are set forth in Table B below:

TABLE B

| Test Material | No. Rats | Cholesterol Liver | Cholesterol Biliary | Enzyme Activity HMG-CoA reductase | Enzyme Activity Cholesterol 7α-hydroxylase | Biliary -Flux |
|---|---|---|---|---|---|---|
| Control | 17 | 2.34 | 0.18 | 0.089 | 8.75 | 6.87 |
| 1%CDCA* | 4 | 2.55 | 0.17 | 0.037 | 8.3 | 12.41 |
| 1%CA** | 5 | 5.96 | 0.20 | 0.035 | 3.1 | 13.18 |
| 2% Cholesterol | 5 | 10.51 | 0.19 | 0.018 | 8.2 | 7.04 |
| 2% Sitosterol | 8 | 2.25 | 0.51 | 0.309 | 11.6 | 6.86 |
| 2% Sitosterol + 1% CDCA | 4 | 2.06 | 0.17 | 0.035 | 8.6 | 14.52 |
| 2% Sitosterol + 1% CA | 4 | 2.30 | 0.20 | 0.094 | 1.8 | 12.69 |

\* CDCA = 3α,7α-dihydroxy-5β-cholanic acid
\*\*CA = 3α,7α,12α-trihydroxy-5β-cholanic acid.

EXAMPLE III

A. W. a male patient suffering from Type II hyperlipidemia (Fredrickson classification) was tested to determine control cholesterol values. The patient was then treated with composition 2 of Table A above to determine its effect on cholesterol levels. The results obtained are reported in Table C, below:

TABLE C

| Composition | Daily Dosage | Cholesterol Level After 0 Weeks | 2 Weeks | 4 Weeks | 6 Weeks |
|---|---|---|---|---|---|
| Comp. 2 Table A | t.i.d. | 620 | 404 | 416 | 401 |

This shows the compositions of this invention to have a very high hypocholesteremic activity.

EXAMPLE IV

A 43 year old female patient suffering from cholelithiasis was treated in accordance with this invention. A composition comprising 250 mg. of 3α,7α-dihydroxy-5β-cholanic acid and 700 mg. of 62-sitosterol was orally administered to the patient 3 times each day over a period of three months. Comparative radiological studies made prior to therapy and after 3 months of therapy clearly demonstrate a reduction in the size of the patient's gallstones in the order of magnitude of 40%.

The invention may be variously otherwise embodied within the scope of the appended claims.

What is claimed is:

1. A composition useful in reducing the cholesterol and lipid levels of human beings which consists of, in combination;
   a. A small but effective amount sufficient to effect a reduction in the cholesterol and lipid levels of said human being, of a sitosterol selected from the group consisting of α-sitosterol, β-sitosterol, and γ-sitosterol; and
   b. A small but effective amount sufficient to effect a reduction in the cholesterol and lipid levels of said human being, of a steroid compound of the formula:

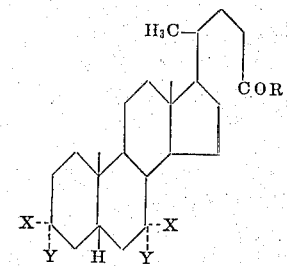

wherein
R is hydroxy, acyloxy of a hydrocarbon carboxylic acid of less than 12 carbon atoms, alkoxy of less than 13 carbon atoms, NHCH$_2$COOH, or NHCH$_2$CH$_2$SO$_3$H;
each X is hydrogen;
each Y is hydroxy, or acyloxy of a hydrocarbon carboxylic acid of less than 12 carbon atoms;
and X and Y when taken together is oxo (O=); and the non-toxic, pharmaceutically acceptable salts thereof.

2. The composition of claim 1 wherein the sitosterol is β-sitosterol.

3. The composition in claim 1 wherein β-sitosterol is combined with 3α,7α-dihydroxy-5β-cholanic acid.

4. The composition of claim 1 wherein the sitosterol is present in a sufficient amount to provide a daily dosage of from 0.5 to 12.0 grams to the patient being treated; and the steroid compound is present in a sufficient amount to provide a daily dosage of from 50 mg. to 1.5 gm. to the patient being treated.

5. The method of reducing the cholesterol and lipid levels of a human being which comprises, orally administering to said human being a small but effective amount, sufficient to effect a reduction of the cholesterol and lipid levels of said human being, of a combination consisting of:
a. a small but effective amount of sitosterol selected from the group consisting of α-sitosterol, β-sitosterol and γ-sitosterol; and
b. a small but effective amount of a steroid of the formula:

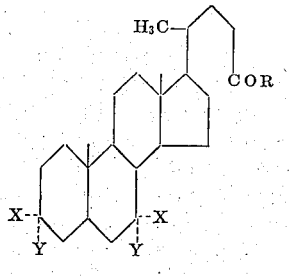

wherein

R is hydroxy, acyloxy of a hydrocarbon carboxylic acid of less than 12 carbon atoms, NHCH$_2$COOH, or NHCH$_2$CH$_2$SO$_3$H;
each X is hydrogen;
each Y is hydroxy, acyloxy of a hydrocarbon carboxylic acid of less than 12 carbon atoms;
and X and Y when taken together is oxo (O=); and the non-toxic, pharmaceutically acceptable salts thereof.

6. The method of claim 5 wherein the sitosterol is β-sitosterol and the steroid compound is 3α,7α-dihydroxy-5β-cholanic acid.

7. The method of claim 5 wherein the effective amount of the sitosterol is sufficient to provide daily dosage of from 0.5 to 10.0 gm. to the said human being; and the effective amount of the steroid compound is sufficient to provide a daily dosage of from 50 mg. to 1.5 gm. to the said human being.

8. The method of reducing cholesterol and lipid levels in human beings which comprises:
a. Initially orally administering to said human beings the composition of claim 1; and
b. Thereafter orally administering to said human beings a small but effective amount sufficient to effect a reduction in the cholesterol and lipid levels of said human being, of a compound of the formula

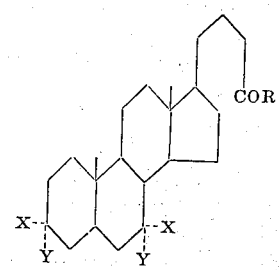

wherein R, X and Y are as defined in claim 1.

9. The composition of claim 1, wherein the steroid compound is 3α,7α-dihydroxy-5β-cholanic acid.

10. The method of claim 5, wherein the steroid is 3α,7α-dihydroxy-5β-cholanic acid.

* * * * *

UNITED STATES PATENT OFFICE
CERTIFICATE OF CORRECTION

Patent No. 3,852,440                  Dated December 3, 1974

Inventor(s)   Alan Hugh Weigand

It is certified that error appears in the above-identified patent and that said Letters Patent are hereby corrected as shown below:

In the Abstract: and Column 3, line 1, the structural formula each occurrence, should appear as shown below:

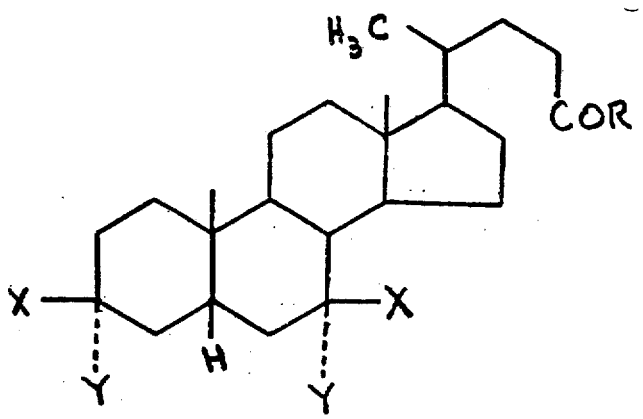

FORM PO-1050 (10-69)

UNITED STATES PATENT OFFICE
CERTIFICATE OF CORRECTION

Patent No. 3,852,440                Dated December 3, 1974

Inventor(s) Alan Hugh Weigand                          Page - 2

It is certified that error appears in the above-identified patent and that said Letters Patent are hereby corrected as shown below:

Claims 1, 5 and 8, the structural formula, each occurrence, should appear as shown below:

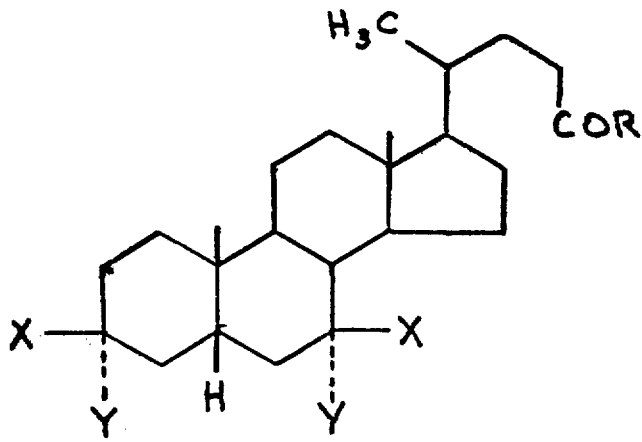

$\mathfrak{Signed}$ and $\mathfrak{Sealed}$ this fourth Day of November 1975

[SEAL]

Attest:

RUTH C. MASON
*Attesting Officer*

C. MARSHALL DANN
*Commissioner of Patents and Trademarks*